(12) United States Patent
Ferrucci et al.

(10) Patent No.: US 8,301,438 B2
(45) Date of Patent: Oct. 30, 2012

(54) METHOD FOR PROCESSING NATURAL LANGUAGE QUESTIONS AND APPARATUS THEREOF

(75) Inventors: David Angelo Ferrucci, Yorktown Heights, NY (US); Li Ma, Beijing (CN); Yue Pan, Beijing (CN); Zhao Ming Qiu, Beijing (CN); Chen Wang, Beijing (CN); Christopher Welty, Hawthorne, NY (US); Lei Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 363 days.

(21) Appl. No.: 12/765,990

(22) Filed: Apr. 23, 2010

(65) Prior Publication Data
US 2010/0299139 A1   Nov. 25, 2010

(30) Foreign Application Priority Data
Apr. 23, 2009   (CN) .......................... 2009 1 0135368

(51) Int. Cl.
*G06F 17/27* (2006.01)
(52) U.S. Cl. .................. 704/9; 704/1; 704/10; 707/706; 707/707; 707/708
(58) Field of Classification Search .................. 704/1, 9, 704/10; 707/706–709
See application file for complete search history.

(56) References Cited

U.S. PATENT DOCUMENTS

| | | | |
|---|---|---|---|
| 7,979,455 B2 * | 7/2011 | Krishnamoorthy et al. | 707/761 |
| 8,078,646 B2 * | 12/2011 | Das et al. | 707/802 |
| 8,140,559 B2 * | 3/2012 | Bobick et al. | 707/761 |
| 2002/0194168 A1 * | 12/2002 | Min et al. | 707/3 |
| 2005/0187926 A1 * | 8/2005 | Britton et al. | 707/3 |
| 2005/0273705 A1 * | 12/2005 | McCain | 715/513 |
| 2005/0289124 A1 | 12/2005 | Kaiser et al. | |
| 2006/0041661 A1 * | 2/2006 | Erikson et al. | 709/225 |
| 2006/0074980 A1 * | 4/2006 | Sarkar | 707/104.1 |
| 2006/0149757 A1 * | 7/2006 | Bird et al. | 707/100 |
| 2006/0235823 A1 * | 10/2006 | Chong et al. | 707/1 |
| 2006/0235837 A1 * | 10/2006 | Chong et al. | 707/4 |
| 2007/0022107 A1 * | 1/2007 | Yuan et al. | 707/4 |
| 2007/0106520 A1 * | 5/2007 | Akkiraju et al. | 705/1 |
| 2007/0198456 A1 * | 8/2007 | Betz et al. | 707/1 |
| 2008/0027981 A1 * | 1/2008 | Wahl | 707/103 R |
| 2008/0104071 A1 | 5/2008 | Pragada et al. | |
| 2008/0109420 A1 * | 5/2008 | Britton et al. | 707/4 |
| 2008/0154871 A1 | 6/2008 | Leidner et al. | |
| 2008/0172440 A1 * | 7/2008 | Jagannathan | 709/201 |
| 2008/0281915 A1 * | 11/2008 | Elad et al. | 709/204 |

(Continued)

OTHER PUBLICATIONS

Tablan et al., A Natural Language Query Interface to Structured Information, 2008, Springer pp. 1-15.*

(Continued)

*Primary Examiner* — David R Hudspeth
*Assistant Examiner* — Lamont Spooner
(74) *Attorney, Agent, or Firm* — Gail H Zarick (57) ABSTRACT

A method and an apparatus for selecting an answer to a natural language question. The method includes: detecting a named entity in the natural language question; extracting information related to an answer from the natural language question; searching in linked data according to the detected named entity; generating a candidate answer according to a search result; parsing the candidate answer according to the information related to the answer; and obtaining a value of a feature of the candidate answer; and evaluating each candidate answer by synthesizing the value of the feature of the candidate answer.

17 Claims, 5 Drawing Sheets

U.S. PATENT DOCUMENTS

| | | | | |
|---|---|---|---|---|
| 2008/0313229 | A1* | 12/2008 | Taswell | 707/104.1 |
| 2009/0013319 | A1* | 1/2009 | Williams et al. | 717/174 |
| 2009/0138498 | A1* | 5/2009 | Krishnamoorthy et al. | 707/103 R |
| 2009/0177634 | A1* | 7/2009 | Behrendt et al. | 707/3 |
| 2009/0192847 | A1* | 7/2009 | Lipkin et al. | 705/7 |
| 2009/0204564 | A1* | 8/2009 | Jung et al. | 706/55 |
| 2009/0254527 | A1* | 10/2009 | Jung et al. | 707/3 |
| 2009/0292716 | A1* | 11/2009 | Oliver et al. | 707/101 |
| 2010/0036788 | A1* | 2/2010 | Wu et al. | 706/47 |
| 2010/0036862 | A1* | 2/2010 | Das et al. | 707/101 |
| 2010/0070448 | A1* | 3/2010 | Omoigui | 706/47 |
| 2010/0174704 | A1* | 7/2010 | Ciravegna et al. | 707/722 |

OTHER PUBLICATIONS

Wang et al., PANTO: A Portable Natural Language Interface to Ontologies, 2007, Springer, pp. 473-487.*

Kaufmann et al., How Useful Are Natural Language Interfaces to the Semantic Web for Casual End-Users?, 2007, Springer, pp. 281-294.*

Bollen et al., Mining associative relations from website logs and their application to context-dependent retrieval using spreading activation, 1999, ACM, pp. 1-6.*

Broekstra et al., Sesame: A Generic Architecture for Storing and Querying RDF and RDF Schema, 2002, ISWC, vol. 2342/2002, pp. 54-68.*

Fininet al., Information Retrieval and the Semantic Web, 2005, System Sciences, pp. 1-10.*

Ran et al., Natrual Language Query System for RDF Repositories, 2007, SNLP, pp. 1-6.*

Bernstein et al., Ginseng: A Guided Input Natural Language Search Engine for Querying Ontologies, 2006, Jena User Conference, pp. 1-3.*

Finin, Swoogle: a search and metadata engine for the semantic web, 2004, ACM, pp. 652-659.*

* cited by examiner

METHOD FOR PROCESSING NATURAL LANGUAGE QUESTIONS AND APPARATUS THEREOF

CROSS REFERENCE TO RELATED APPLICATION

This application claims priority under 35 U.S.C. 119 from Chinese Patent Application 200910135368.8, filed Apr. 24, 2009, the entire contents of which are incorporated herein by reference.

BACKGROUND OF THE INVENTION

1. Field of the Invention

The present invention generally relates to a method and an apparatus for processing natural language questions. More particularly, the present invention relates to a method and an apparatus capable of answering natural language questions using open linked structured information.

2. Description of Related Art

Question Answering (QA) has been a classical and difficult problem in the area of Artificial Intelligence over the past decades. Given a natural language question, e.g., "Justin Henry's first film role as Dustin Hoffman and Meryl Streep's son in this film earned him an Oscar nomination", a computer system would try to return a correct answer in natural language, e.g., "Kramer vs. Kramer", just like what a human being would do.

To meet the need for computer systems to process natural language questions, Natural Language Processing (NLP) techniques have been widely proposed to solve most of QA problems by using unstructured data. Undoubtedly, it is reasonable to develop NLP techniques because over 80% data of the world is unstructured.

Figure 1:
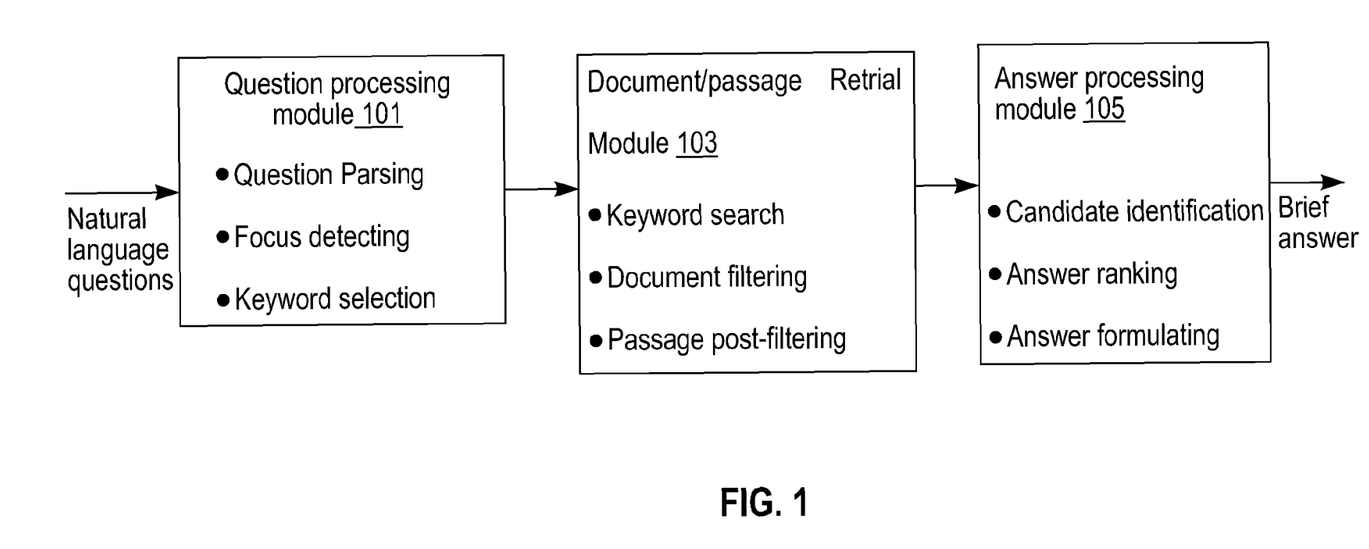
FIG. 1 illustrates a general architecture of an existing QA system.

FIG. 1 illustrates a general architecture of existing QA systems. As shown in FIG. 1, a general QA system includes a question processing module 101, a document/passage retrieval module 103, and an answer processing module 105. For a natural language question raised by a user, question parsing and focus detecting are performed in the question processing module 101, which selects keywords for the question. Then the document/passage retrieval module 103 performs keywords search in a database, and performs document filtering and passage post-filtering in a document containing the keywords, so as to generate candidate answers. Afterwards, the answer processing module 105 performs candidate identification and answer ranking on the candidate answers generated by the document/passage retrieval module 103, and finally formulates an answer to the raised natural language question, so as to output a brief answer to the user in natural language.

Moreover, QA evaluation systems are developed for QA systems to evaluate performance of QA systems. As an evaluation platform for QA, TREC OA track is the best known evaluation platform for QA in the world, where various dataset and question set are provided to evaluate accuracy and performance of different QA systems. However, with the advance of database and semantic Web, structured data are increasingly growing and becoming more important due to their non-ambiguous characteristics compared with the NLP over unstructured data. Furthermore, most of large commercial firms process structured data in their business and store them into database without transferring them into unstructured data.

To support QA with the structured data inside the corporations, new techniques have to be developed, e.g., NLDB (natural language database), which combines NLP with database technologies by providing a natural language interface over the database to ease users to issue questions. The NLDB techniques in general depend on syntax of the database schema, where natural language questions are translated into a few executable SQLs in the database. Therefore, it restricts users to ask questions with specific natural language grammar and returns answers within the scope of the database.

Besides the database, there have been a lot of new structured data with the progress of realizing semantic Web vision, e.g., RDF (Resource Description Framework) data, a form of linked data. Over RDF data, semantic query languages, e.g., SPARQL, have been proposed to query data based on semantics without depending on syntax. However, so far there is no well developed technique to process natural language questions over open linked data without the limitation of natural language grammar.

SUMMARY OF THE INVENTION

In view of the foregoing situations, the present invention provides a method, an apparatus and a computer program for processing natural language questions, to answer natural language questions of open domain and free grammar using open linked structured information.

In accordance with one aspect of the present invention, a computer implemented method for selecting an answer to a natural language question includes the steps of: detecting a named entity in the natural language question; extracting information related to an answer from the natural language question; searching in linked data according to the detected named entity; generating at least one candidate answer according to a search result; parsing the candidate answer according to the information related to the answer, and obtaining a value of a feature of the candidate answer; and evaluating each candidate answer by synthesizing the value of the feature of the candidate answer.

In accordance with another aspect of the present invention, an apparatus for selecting an answer to a natural language question includes: a question parsing module, configured to detect a named entity in the natural language question and extract information related to an answer from the natural language question; a candidate answer generating module, configured to search in linked data according to the detected named entity, and generate a candidate answer according to a search result; a feature value generating module, configured to parse the candidate answer according to the information related to the answer, and obtain a value of a feature of the candidate answer; and a candidate answer evaluating module, configured to evaluate each candidate answer by synthesizing the value of the feature of the candidate answer.

In a further aspect, the present invention provides a computer program product for implementing the above method for selecting an answer to a natural language question.

In a still further aspect, the present invention provides a computer program product which, when executed by a computer, will cause the computer to function as the system for selecting an answer to a natural language question.

BRIEF DESCRIPTION OF THE DRAWINGS

The present invention will be better understood from the following description when taken in conjunction with the accompanying drawings. In the accompanying drawings, the same or corresponding technical features or components are represented by the same or corresponding reference signs. The accompanying drawings together with the following detailed description are included in this specification and form a part of the specification, which are used to describe the principle and advantages of the present invention and preferred embodiments of the present invention by way of example. In the figures.

It should be understood by those skilled in the art components in the figures are showed for the purpose of simplifying and clarifying only, and may not be illustrated in proportion. For example, some of the components in the drawings may be enlarged compared with other components, so as to improve the understanding of embodiments of the present invention.

DETAILED DESCRIPTION OF THE PREFERRED EMBODIMENTS

First, a brief description of the present invention is given to provide a basic understanding of the present invention in some aspects. This introductory description is not exhaustive. It is not intended to determine a key or important part of the present invention, nor is it intended to define the scope of the present invention. The purpose of the introductory description is merely to give some ideas in a simple manner, which serves as a preface to the subsequent detailed description.

According to an aspect of the present invention, a method for processing a natural language question is provided, including: detecting a named entity in the natural language question; extracting information related to an answer from the natural language question; searching in linked data according to the detected named entity; generating a candidate answer according to a search result; parsing the candidate answer according to the information related to the answer, and obtaining a value of a feature of the candidate answer; and evaluating each candidate answer by synthesizing the value of the feature of the candidate answer.

According to a preferred embodiment of the present invention, the step of searching in linked data according to the detected named entity comprises: searching for a Uniform Resource Identifier, URI, matching to the named entity in the linked data based on similarity; and searching with spreading activation, for a URI linked to the URI matching to the named entity by using linking relationship between URIs. Furthermore, the method includes generating the candidate answer according to the linked URI.

Preferably, candidate answers retrieved from different linked data are merged according to the feature of the candidate answers, before the step of evaluating each candidate answer by synthesizing the value of the feature of the candidate answer A method according to a preferred embodiment of the present invention further includes performing machine learning according to the feature of the candidate answer to train a scoring model; and computing a score for each candidate answer according to the scoring model while synthesizing the value of the feature of the candidate answer to evaluate each candidate answer.

According to another aspect of the present invention, an apparatus for processing a natural language question is provided, including: a question parsing module, configured to detect a named entity in the natural language question and extract information related to an answer from the natural language question; a candidate answer generating module, configured to search in linked data according to the detected named entity, and generate a candidate answer according to a search result; a feature value generating module, configured to parse the candidate answer according to the information related to the answer, and obtain a value of a feature of the candidate answer; and a candidate answer evaluating module, configured to evaluate each candidate answer by synthesizing the value of the feature of the candidate answer.

Exemplary embodiments of the present invention are described in conjunction with the accompanying drawings hereinafter. For the sake of clarity and conciseness, not all characteristics of practical embodiments are described in the specification. However, it should be appreciated that many embodiment-specific decisions have to be made in developing one of the practical embodiments, in order to achieve a particular object of the developer, e.g., the accordance with a system and service associated restricting condition which may be changeable dependent on different embodiments. Furthermore, it should also be understood that, although the development may be complex and time-consuming, it is just a routine task for those skilled in the art benefited from the present disclosure.

It should be further noted here that only apparatus structures and/or processing steps directly related to the solution according to the present invention are illustrated in the figures, and other details less related to the present invention are omitted, so that the present invention would not be blurred by unnecessary details.

To describe the principle of the present invention, RDF data are used as an example of linked data to describe embodiments of the present invention hereinafter, because RDF data are prevailing on the Web and cover various data and knowledge. Particularly, so far the W3C Linking Open Data (LOD) project have interlinked more than 30 open license datasets which consists of over 2 billion RDF triples.

Besides the physical RDF data, virtual RDF datasets are growing as well. Many large corporations manage and process structured data inside their individual business system and need to integrate their structured data as well. A virtual RDF view can be conveniently built based on their structured databases using some semantic Web tools such as Virtuoso, D2R and SeDA.

However, it should be understood by those skilled in the art that, the present invention is not limited to RDF data, but can also be applied to various linked data, such as linked data obtained by mapping Micro-format data.

Next, Dbpedia is used as a particular example of RDF, and the principle of the present invention is illustrated hereinafter by describing how the answer to the natural language question "In this 1992 Robert Altman film, Tim Robbins gets angry messages from a screenwriter he's snubbed" is obtained.

Figure 2:
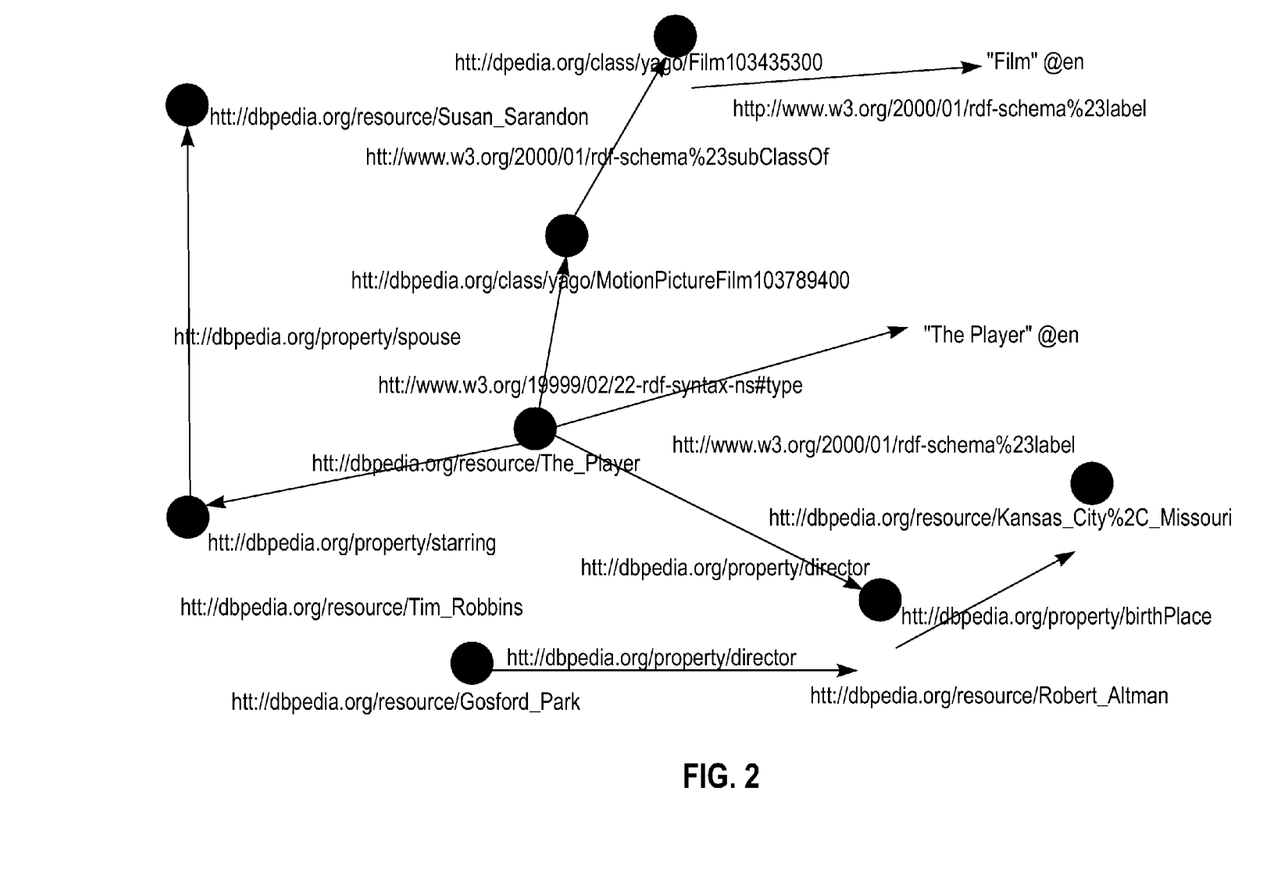
FIG. 2 illustrates a graph structure of RDF triples.

Some RDF triple data related to the above natural language question in DBpedia are listed below first, and its graph structure is illustrated in FIG. 2.

- <http://dbpedia.org/resource/The_Player>
  <http://dbpedia.org/property/director>
  <http://dbpedia.org/resource/Robert_Altman>.
- <http://dbpedia.org/resource/The_Player>
  <http://www.w3.org/2000/01/rdf-schema%23label>
  "The Player"@en.
- <http://dbpedia.org/resource/Gosford_Park>
  <http://dbpedia.org/property/director>
  <http://dbpedia.org/resource/Robert_Altman>.
- <http://dbpedia.org/resource/Robert_Altman>
  <http://dbpedia.org/property/birthPlace>
  <http://dbpedia.org/resource/Kansas_City%2C_Missouri>.
- <http://dbpedia.org/resource/The_Player>
  <http://dbpedia.org/property/starring>
  <http://dbpedia.org/resource/Tim_Robbins>.
- <http://dbpedia.org/resource/Tim_Robbins>
  <http://dbpedia.org/property/spouse>
  <http://dbpedia.org/resource/Susan_Sarandon>.
- <http://dbpedia.org/resource/The_Player>
  <http://www.w3.org/1999/02/22-rdf-syntax-ns#type>
  <http://dbpedia.org/class/yago/MotionPictureFilm103789400>.
- <http://dbpedia.org/class/yago/MotionPictureFilm103789400>
  <http://www.w3.org/2000/01/rdf-schema%23subClassOf>
  <http://dbpedia.org/class/yago/Film103435300>.
- <http://dbpedia.org/class/yago/Film103435300>
  <http://www.w3.org/2000/01/rdf-schema%23label>
  "Film"@en.

In FIG. 2, circles represent URIs (Universal Resource Identifiers) related to named entities, which are subjects and objects in the RDF triples. Lines connecting two circles indicate the relationship between the named entities, which are predicates in the RDF triples. Taking the first of the above RDF triples as an example: "<http://dbpedia.org/resource/The_Player> <http://dbpedia.org/property/director> <http://dbpedia.org/resource/Robert_Altman>", "The_Player" and "Robert_Altman" are named entities, "<http://dbpedia.org/resource/The_Player>" is the URI related to the named entity "The_Player", and <http://dbpedia.org/resource/Robert_Altman> is the URI related to the named entity "Robert_Altman", which are therefore indicated by circles in the graph structure shown in FIG. 2. Furthermore, as the predicate in the RDF triple, "<http://dbpedia.org/property/director>" indicates the relationship between the named entities "The_Player" and "Robert_Altman", that is, "Robert_Altman" is the "director" of the film "The_Player". Other RDF triples can be parsed in the same way and are not listed here one by one.

Figure 3:
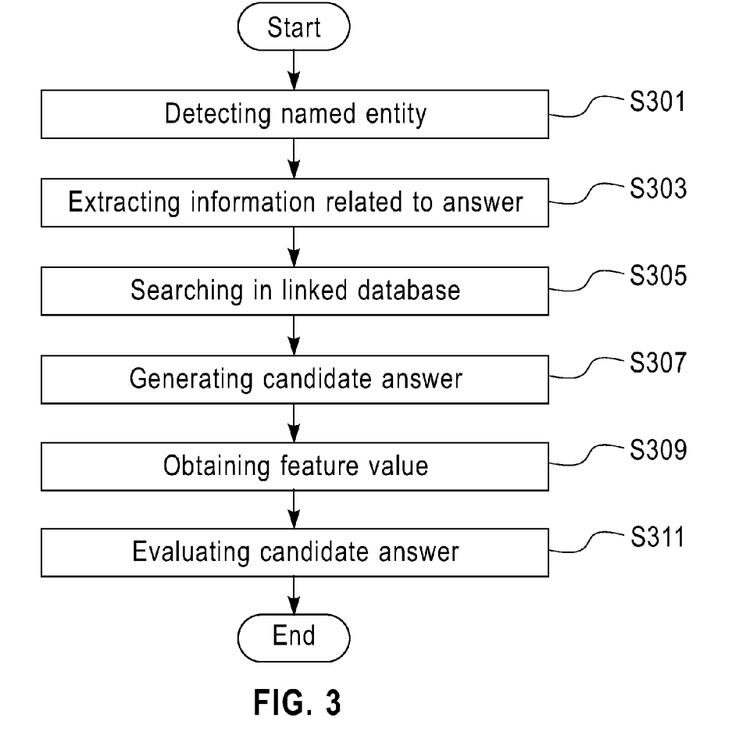
FIG. 3 is a general flow chart of a method for processing natural language questions according to an embodiment of the present invention.

FIG. 3 is a general flow chart of a method for processing natural language questions according to an embodiment of the present invention. As shown in FIG. 3, the method for processing natural language questions according to an embodiment of the present invention includes named entity detection step S301, answer-related information extraction step S303, linked database retrieval step S305, candidate answer generation step S307, feature value obtaining step S309, and candidate answer evaluation step S311.

First, in step S301 for named entity detection, a natural language question inputted by the user is parsed and a named entity is detected. Next, information related to an answer is extracted from the natural language question in the answer-related information extraction step S303.

For example, from the natural language question "In this 1992 Robert Altman film, Tim Robbins gets angry messages from a screenwriter he's snubbed", named entities "Robert_Altman" and "Tim Robbins" can be detected, and information "film" related to the type of the answer and time verification information "1992" related to the answer can be extracted.

Then, in step S305 for linked database retrieval, search is performed in different data sources such as linked data of DBpedia and IMDB based on the named entities detected in named entity detection step S301. Next, in candidate answer generation step S307, a candidate answer is generated based on a search result from linked database retrieval step S305.

Figure 4:
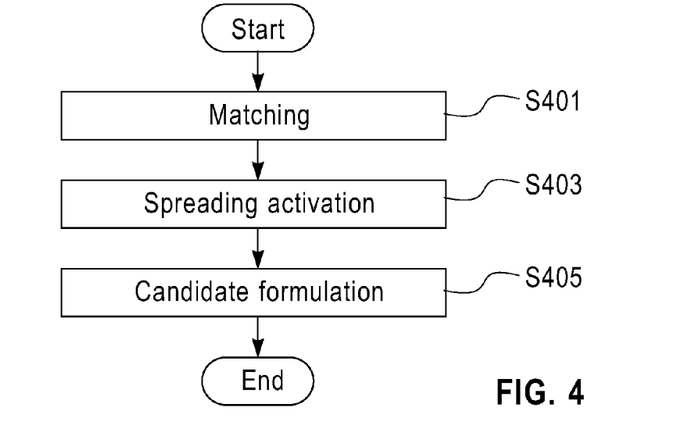
FIG. 4 is a flow chart of the step of searching in a linked database and generating a candidate answer according to an embodiment of the present invention.

FIG. 4 is a flow chart of the step of searching in a linked database and generating a candidate answer according to an embodiment of the present invention. As shown in FIG. 4, first in matching step S401, a URI matching to a named entity is searched for in linked data based on similarity. For the above exemplary natural language question, based on the named entities "Robert_Altman" and "Tim Robbins" detected in named entity detection step S301, matching URIs "<http://dbpedia.org/resource/Robert_Altman>" and "<http://dbpedia.org/resource/Tim_Robbins>" can be retrieved from DBpedia respectively.

Next, in spreading activation step S403, a URI directly linked to the URI matching to the named entity is searched for with spreading activation using linking relationship between URIs. In the example above, for the URI "<http://dbpedia.org/resource/Robert_Altman>" matching to the named entity "Robert_Altman", URIs directly linked to it can be obtained easily from the graph structure shown in FIG. 2 by spreading activation, e.g. "<http://dbpedia.org/resource/The_Player>", "<http://dbpedia.org/resource/Gosford_Park>" and "<http://dbpedia.org/resource/Kansas_City%2C_Missouri>". For the URI "<http://dbpedia.org/resource/Tim_Robbins>" matching to the named entity "Tim Robbins", URIs directly linked to it can also be easily obtained from the graph structure shown in FIG. 2 by spreading activation, e.g. "<http://dbpedia.org/resource/The_Player>" and "<http://dbpedia.org/resource/Susan_Sarandon>".

After obtaining each of the above URIs by spreading activation, candidate answers can be extracted from the directly linked URIs, where the candidate answers may be a label contained in a URI. For the above example, candidate answers such as "The_Player", "Gosford_Park", "Kansas_City" and "Susan_Sarandon" can be extracted from the directly linked URIs obtained in spreading activation step S403. In this embodiment, URIs directly linked to the URIs matching to the named entities are searched for with spreading activation, and candidate answers are generated based on directly linked URIs. However, those skilled in the art would understand that, it is not limited to the directly linked URIs in searching with spreading activation and generating candidate answers.

After generating candidate answers according to the process illustrated in FIG. 4, next in the feature value obtaining step S309 shown in FIG. 3, the candidate answers are parsed based on the information related to the answer extracted in answer-related information extraction step S303, so as to obtain values of a feature of the candidate answers.

The feature of the candidate answers here includes the information related to the answer, and the number of directly linked URIs associated with the candidate answer. The information related to the answer includes, for example, information "film" related to the type of the answer and time verification information "1992" related to the answer. Answer-type related information may be indicated by "tycor", and time verification information may be directly indicated by "year". The number of directly linked URIs associated with the candidate answer is, for example, the number of URIs directly linked to each of the URIs of the candidate answers, which feature is hereby indicated by "triple". Accordingly, values of features of each candidate answers for the above specific example are given in Table 1.

TABLE 1

Feature values of candidate answers

| Candidate answer | Feature value | | |
|---|---|---|---|
| The_Player | tycor = 1 | triple = 2 | year = 1 |
| Gosford_Park | tycor = 1 | triple = 1 | year = 0 |
| Kansas_City | tycor = 0 | triple = 1 | year = 0 |
| Susan_Sarandon | tycor = 0 | triple = 1 | year = 0 |

As can be seen from Table 1, for the feature "tycor", as the candidate answers "The_Player" and "Gosford_Park" both are film titles, consistent with the answer-type related information "film" extracted in answer-related information extraction step S303, therefore their tycor=1. The candidate answer "Kansas_City" is a city name, and "Susan_Sarandon" is a human name, not consistent with the answer-type related information "film", therefore their tycor=0. For the feature "triple", it can be seen intuitively from FIG. 2 that, the numbers of URIs directly linked to the candidate answers "The_Player", "Gosford_Park", "Kansas_City" and "Susan_Sarandon" and related to the named entities "Robert_Altman" and "Tim Robbins" are 2, 1, 1 and 1, respectively, therefore their "triple" values are assigned with 2, 1, 1 and 1, respectively. For the feature "year", as the time verification information "1992" extracted in answer-related information extraction step S303 is present only in the URI "<http://www.w3.org/1999/02/22-rdf-syntax-ns#type>" linked to the candidate answer "The_Player", the "year" value of the candidate answer "The_Player" is assigned with 1, and the "year" value of the other candidate answers are assigned with zero.

It should be noted that, features of the candidate answers are not limited to information related to a type of the answer, the number of directly linked URIs related to the candidate answers, and time verification information related to the answer as mentioned in the above example, but may include various information relating to an answer, named entity, URI or the like, for example, linking information between URIs matching to a named entity.

After obtaining the values of features of candidate answers in feature value obtaining step S309, the values of features of candidate answers can be synthesized in the candidate answer evaluation step S311, so that each of the candidate answers can be evaluated and a best answer can be provided to the user.

According to a preferred embodiment of the present invention, machine learning is performed in advance in accordance with given features of candidate answers, to obtain a satisfying scoring model. Accordingly, when synthesizing the values of features of candidate answers in the candidate answer evaluation step S311, a score can be computed for each candidate answer using the trained scoring model, and the candidate answer with the highest score can be selected as the final answer provided to the user. Table 2 below shows the scoring results obtained by evaluating each candidate answer in the above example.

TABLE 2

Evaluation of candidate answers

| Candidate answer | Feature value | | | Evaluation score |
|---|---|---|---|---|
| The_Player | tycor = 1 | triple = 2 | year = 1 | 100 |
| Gosford_Park | tycor = 1 | triple = 1 | year = 0 | 60 |
| Kansas_City | tycor = 0 | triple = 1 | year = 0 | 0 |
| Susan_Sarandon | tycor = 0 | triple = 1 | year = 0 | 0 |

In Table 2, for the candidate answer "The_Player", not only its answer type matches the desired answer type, but also its time related verification information conforms, and it has the largest number of directly linked URIs associated with candidate answers, therefore, it is given the highest score 100 and provided to the user as the best answer. For the candidate answer "Gosford_Park", as its feature "year=0", and the number of directly linked URIs associated with candidate answers is only 1, therefore it is not the best answer and given a score 60 although its answer type matches the desired answer type. Furthermore, for the candidate answers "Kansas_City" and "Susan_Sarandon", as both of their answer-type values are 0 and do not match the desired answer type, both of their final evaluation scores are 0.

As a matter of course, the evaluation results in Table 2 are given as examples only. In practice, different weights may be given to the features based on different situations, and evaluation of candidate answers can be performed accordingly.

Furthermore, it should also be noted that, candidate answers are not necessarily obtained from the same linked data, e.g. DBpedia used in the above example. Candidate answers may be retrieved from different linked data. Therefore, if candidate answers are obtained from different linked data respectively, before evaluating the candidate answers in candidate answer evaluation step S311, the candidate answers retrieved from different linked data may be merged according to a feature of the candidate answers, so that repeated candidate answers can be avoided.

The processing process of the method for processing natural language questions according to an embodiment of the present invention is described above. The working principle of an apparatus for processing natural language questions according to an embodiment of the present invention is described hereinafter in conjunction with FIG. 5 and FIG. 6.

Figure 5:
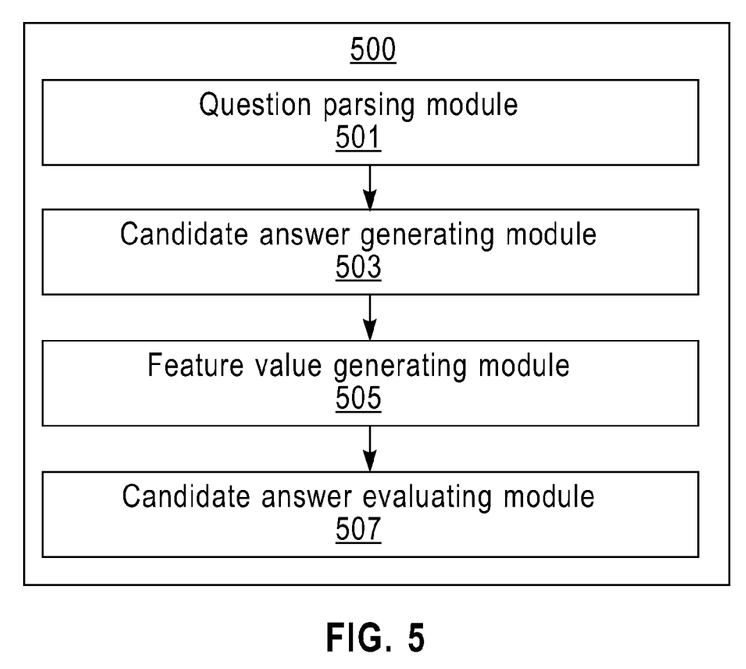
FIG. 5 is a schematic structural block diagram of an apparatus for processing natural language questions according to an embodiment of the present invention.

FIG. 5 is a structural block diagram of an apparatus 500 for processing natural language questions according to an embodiment of the present invention. As shown in FIG. 5, the apparatus 500 for processing natural language questions according to an embodiment of the present invention includes: a question parsing module 501, a candidate answer generating module 503, a feature value generating module 505, and a candidate answer evaluating module 507.

First, the question parsing module 501 parses the natural language question, detects a named entity and extracts information related to an answer from the natural language question. Then, the candidate answer generating module 503 searches in linked data such as DBpedia and IMDB according to the named entity detected by the question parsing module 501, and thereby generates candidate answers. Next, the feature value generating module 505 parses the candidate answers generated by the candidate answer generating module 503 according to the information related to the answers, and obtains values of a feature of the candidate answers. Finally, the candidate answer evaluating module 507 evaluates each candidate answer by synthesizing the values of the features of the candidate answers, and provides the best candidate answer to the user as the final result.

Figure 6:
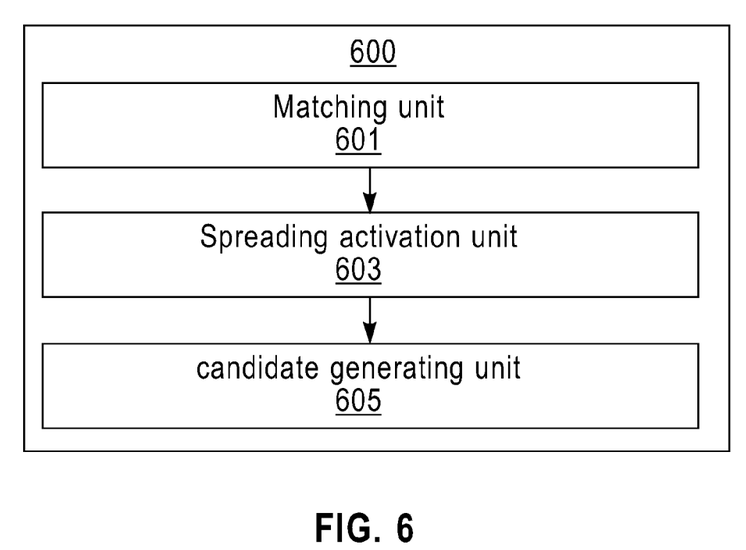
FIG. 6 is a schematic structural block diagram of a candidate answer generating module according to an embodiment of the present invention.

FIG. 6 is a schematic structural block diagram of a candidate answer generating module 600 according to a preferred embodiment of the present invention. As shown in FIG. 6, the candidate answer generating module 600 according to the embodiment includes a matching unit 601, a spreading activation unit 603 and a candidate generating unit 605.

The matching unit 601 searches for a URI matching to the named entity in the linked data based on similarity; the spreading activation unit 603 searches with spreading activation for a URI directly linked to the URI obtained by the matching unit 601 matching to the named entity by using the linking relationship between URIs; and the candidate generating unit 605 generates the candidate answers according to the directly linked URI retrieved by the spreading activation unit 603.

The candidate generating unit 605 may use a label contained in a URI as a candidate answer. The feature of the candidate answers should at least include information related to the answer, and the number of directly linked URIs associated with the candidate answers. The information related to the answer at least includes the type of the answer.

According to a preferred embodiment of the present invention, the information related to the answer may further include time verification information related to the answer extracted from the natural language question, and the features of the candidate answers may further include linking information between URIs matching to a named entity.

It should be noted that, candidate answers are not necessarily obtained from the same linked data, but may be retrieved from different linked data. Therefore, a preferred embodiment of the present invention may include a merging module (not shown in the figure), which is configured to, if candidate answers are obtained from different linked data, merge the candidate answers retrieved from different linked data according to a feature of the candidate answers before the candidate answer evaluation module 507 evaluates the candidate answers, so that repeated candidate answers can be avoided.

In addition, the apparatus for processing natural language questions according to a preferred embodiment of the present invention may further include a training module (not shown in the figure), which is configured to perform machine learning in advance according to given features of candidate answers, so as to obtain a satisfying scoring model. Accordingly, when the candidate evaluation module 507 synthesizes the values of features of candidate answers, a score can be computed for each candidate answer using the trained scoring model, and the candidate answer with the highest score can be selected as the final answer provided to the user.

It should also be noted that, detailed processing processes of the question parsing module 501, the candidate answer generating module 503, the feature value generating module 505, and the candidate answer evaluating module 507 in the apparatus for processing natural language questions according to the present invention are similar to those of named entity detection step S301, answer-related information extraction step S303, linked database retrieval step S305, candidate answer generation step S307, feature value obtaining step S309 and candidate answer evaluation step S311 in the method for processing natural language questions described with reference to FIG. 3, respectively. And detailed processes of the matching unit 601, the spreading activation unit 603 and the candidate generating unit 605 in the candidate answer generating module 600 are similar to those of the matching step S401, the spreading activation step S403 and the candidate generating step S405 in the candidate answer generation method described with reference to FIG. 4. Therefore, further detailed description is omitted.

As can be seen from the description of the embodiments of the present invention and the analysis of the prior art, when analyzing documents/sentences/words using NLP techniques, as natural language is extremely hard to be well parsed, existing QA systems over unstructured data have to process many ambiguous problems. However, the method and apparatus for processing natural language questions according to an embodiment of the present invention is a QA system over structured data, therefore may improve precision of QA systems based on existing huge amount of linked data.

In addition, the method and the apparatus for processing natural language questions according to an embodiment of the present invention may assist corporations enable QA systems over a virtual RDF view, applicable for huge amount of RDF data and virtual RDF data generated by the corporations without need of changing the existing QA systems.

The basic principle of the present invention is described in conjunction with the embodiments above. However, for those skilled in the art, it should be understood that, each or any step or component of the method and the apparatus of the present invention may be implemented with hardware, firmware, software or a combination thereof in any computing apparatus, including processors, storage medium and the like, or a network of computing apparatuses, which can be done by those skilled in the art with basic programming skills after reading the specification of the present invention.

Therefore, the object of the present invention may also be implemented by executing a program or a series of programs on any computing apparatus. The computing apparatus can be a known general-purpose apparatus. Therefore, the object of the present invention can be implemented through program products providing program codes that implement the method or the apparatus. That is, such a program product also constitutes the present invention, and storage medium stored with such a program product also constitute the present invention. Apparently, the storage medium can be any known storage medium or any storage medium to be developed in the future.

Figure 7:
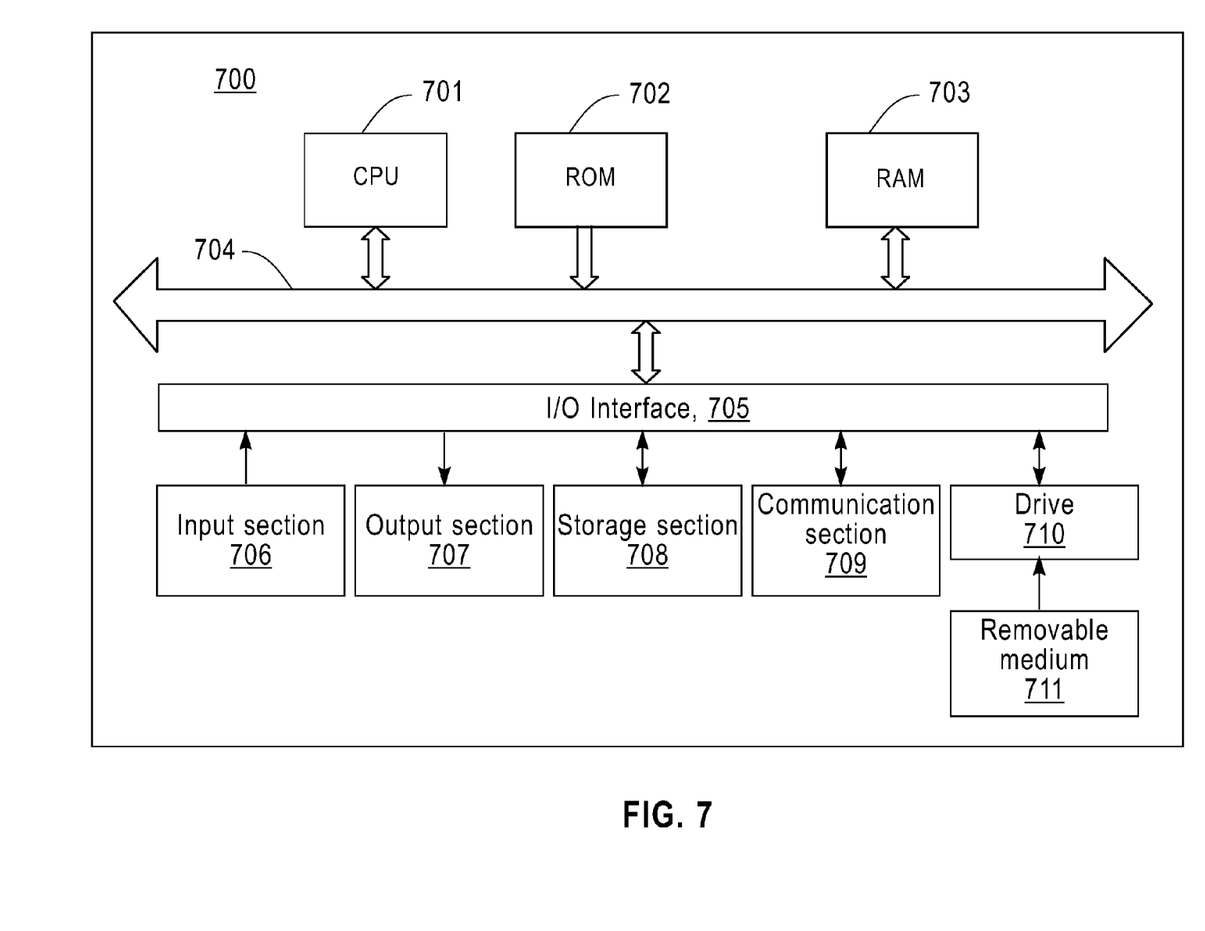
FIG. 7 is a structural block diagram of an information processing device for implementing a method for processing natural language questions according to the present invention.

In case of implementing the embodiments of the present invention by software and/or firmware, a program constituting the software may be installed into a computer with dedicated hardware, for example, a general-purpose personal computer 700 as shown in FIG. 7 from a storage medium or a network, and the computer is capable of performing various functions if with various programs installed therein.

In FIG. 7, a Central Processing Unit (CPU) 701 performs various processing based on a program stored in a Read Only Memory (ROM) 702 or a program loaded from a storage section 708 to a Random Access Memory (RAM) 703. In the RAM 703, required data when the CPU 701 performs the various processing or the like is also stored as necessary. The CPU 701, the ROM 702, and the RAM 703 are connected to one another via a bus 704. An input/output interface 705 is also connected to the bus 704.

The following components are connected to the input/output interface 705: an input section 706 including a keyboard, a mouse, or the like; an output section 707 including a display such as a Cathode Ray Tube (CRT), a Liquid Crystal Display (LCD), or the like, and a loudspeaker or the like; the storage section 708 including a hard disk or the like; and a communication section 709 including a network interface card such as a LAN card, a modem, or the like. The communication section 709 performs communication processing via the network such as the Internet.

A drive 710 is also connected to the input/output interface 705 as necessary. A removable medium 711, such as a magnetic disk, an optical disk, a magneto-optical disk, a semiconductor memory, or the like, is installed on the drive 710 as necessary, so that a computer program read therefrom may be installed into the storage section 708 as necessary.

In the case where the above-described series of processing is implemented with software, the program that constitutes the software may be installed from a network such as the Internet or a storage medium such as the removable medium 711.

Those skilled in the art would appreciate that, the storage medium is not limited to the removable medium 711 having the program stored therein as illustrated in FIG. 7, which is distributed separately from the device for providing the program to the user. Examples of the removable medium 711 include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM 702, the hard disk contained in the storage section 708, or the like, which has the program stored therein and is distributed to the user together with the device that contains them.

It should also be noted that, in the apparatus and method of the present invention, components or steps may be decomposed and/or recombined. The decomposition and/or recombination should be considered as equivalent solutions of the present invention. The steps performing the above described series of processing need not necessarily be performed chronologically in the natural order of the description. Some steps may be performed in parallel or independently of one another.

The present invention and its advantages have been described in detail. However, it will be understood by those skilled in the art that various modifications, combinations, sub-combinations and alterations depending on design and other factors are within the scope of the appended claims. The terms "comprise", "comprising," "include" or any other variations thereof, are intended to cover a non-exclusive inclusion so that a process, method, article, or device that comprises a list of elements does not only include these elements but also may include other elements not explicitly listed or inherent to such process, method, article, or device. An element preceded by "a" or "an" does not, if without more constraints, preclude the existence of additional identical elements in the process, method, article, or device that comprises the element.

What is claimed is:

1. A computer implemented method for selecting an answer to a natural language question, comprising the steps of:
   detecting a named entity in the natural language question;
   extracting information related to an answer from the natural language question;
   searching in linked data according to the detected named entity;
   generating at least one candidate answer according to a search result;
   parsing the candidate answer according to the information related to the answer;
   obtaining a value of a feature of the candidate answer; and
   evaluating each candidate answer by synthesizing the value of the feature of the candidate answer thereby selecting the answer to the natural language question;
   wherein the step of searching in linked data according to the detected named entity comprises:
   searching for a Uniform Resource Identifier (URI), matching to the named entity in the linked data based on similarity; and searching with spreading activation, for a URI linked to the URI matching to the named entity by using linking relationship between URIs; and
   generating the candidate answer according to the linked URI;
   wherein the candidate answer is a label contained in the URI; and
   wherein at least one of the steps is carried out by a processor device.

2. The method according to claim 1, wherein the feature of the candidate answer comprises at least the information related to the answer, and the number of directly linked URIs associated with the candidate answer.

3. The method according to claim 2, wherein the information related to the answer comprises at least a type of the answer.

4. The method according to claim 3, wherein the information related to the answer further comprises time verification information related to the answer extracted from the natural language question, and the feature of the candidate answer further comprises linking information between URIs matching to the named entity.

5. The method according to claim 1, further comprising merging candidate answers retrieved from different linked data according to the feature of the candidate answers.

6. The method according to claim 1, further comprising:
   performing machine learning according to the feature of the candidate answer to train a scoring model; and
   computing a score for each candidate answer according to the scoring model while evaluating each candidate answer.

7. The method according to claim 1, wherein the linked data is Resource Description Framework data.

8. The method according to claim 1, wherein the linked data is obtained by mapping Micro-format data.

9. A non-transitory computer-readable storage medium tangibly embodying computer-executable program instructions which, when executed, cause a computer to perform a method for selecting an answer to a natural language question according to claim 1.

10. An apparatus for selecting an answer to a natural language question, comprising:
    a processor and a memory;
    wherein the processor includes:
    a question parsing module configured to detect a named entity in the natural language question and extract information related to an answer from the natural language question;
    a candidate answer generating module configured to search in linked data according to the detected named entity and generate a candidate answer according to a search result;
    a feature value generating module configured to parse the candidate answer according to the information related to the answer and obtain a value of a feature of the candidate answer; and
    a candidate answer evaluating module configured to evaluate each candidate answer by synthesizing the value of the feature of the candidate answer thereby selecting the answer to the natural language question;
    wherein the candidate answer generating module comprises:
    a matching unit, configured to search for a Uniform Resource Identifier, URI, matching to the named entity in the linked data based on similarity;

a spreading activation unit, configured to search with spreading activation for a URI linked to the URI matching to the named entity by using linking relationship between URIs; and a candidate generating unit, configured to generate the candidate answer according to the linked URI;

wherein the candidate generating unit uses a label contained in the URI as the candidate answer.

11. The apparatus according to claim 10, wherein the feature of the candidate answer comprises at least the information related to the answer, and the number of directly linked URIs associated with the candidate answer.

12. The apparatus according to claim 11, wherein the information related to the answer comprises at least a type of the answer.

13. The apparatus according to claim 12, wherein:

the information related to the answer further comprises time verification information related to the answer extracted from the natural language question; and the feature of the candidate answer further comprises linking information between URIs matching to the named entity.

14. The apparatus according to claim 10, further comprising a merging module configured to merge candidate answers retrieved from different linked data according to the feature of the candidate answers.

15. The apparatus according to claim 10, further comprising a training module configured to perform machine learning according to the feature of the candidate answer to train a scoring model; and wherein the candidate answer evaluating module computes a score for each candidate answer according to the scoring model while evaluating each candidate answer.

16. The apparatus according to claim 10, wherein the linked data is Resource Description Framework data.

17. The apparatus according to claim 10, wherein the linked data is obtained by mapping Micro-format data.

* * * * *